(12) United States Patent
Kemmerer

(10) Patent No.: US 6,547,123 B2
(45) Date of Patent: Apr. 15, 2003

(54) METHOD AND APPARATUS FOR PRODUCING FULL FACE VEHICLE WHEEL

(75) Inventor: James H. Kemmerer, Sweet Springs, MO (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/815,426

(22) Filed: Mar. 22, 2001

(65) Prior Publication Data

US 2002/0134820 A1 Sep. 26, 2002

(51) Int. Cl.$^7$ .......................... B23K 31/00; B23P 17/00
(52) U.S. Cl. ................... 228/212; 228/178; 29/894.322
(58) Field of Search ...................... 29/894.322; 228/212

(56) References Cited

U.S. PATENT DOCUMENTS

| | | | | |
|---|---|---|---|---|
| 4,106,172 A | * | 8/1978 | Bache | 228/114.5 |
| 5,029,385 A | * | 7/1991 | Daniels | 29/802 |
| 5,188,278 A | * | 2/1993 | Amao | 228/114 |
| 5,360,261 A | * | 11/1994 | Archibald et al. | 301/63.105 |
| 5,533,261 A | * | 7/1996 | Kemmerer | 29/894.322 |
| 5,579,578 A | * | 12/1996 | Ashley, Jr. | 29/894.322 |
| 5,779,951 A | * | 7/1998 | Osborne | 264/261 |
| 6,282,788 B1 | * | 9/2001 | Politi et al. | 29/894 |
| 6,286,908 B1 | * | 9/2001 | Maloney et al. | 301/37.43 |
| 6,357,116 B1 | * | 3/2002 | Waelchli et al. | 29/252 |
| 6,370,777 B1 | * | 4/2002 | Heck | 29/894.322 |

FOREIGN PATENT DOCUMENTS

JP  401154888 A  *  6/1989

\* cited by examiner

Primary Examiner—M. Alexandra Elve
Assistant Examiner—Kevin McHenry
(74) Attorney, Agent, or Firm—MacMillan, Sobanski & Todd, LLC

(57) ABSTRACT

This invention relates to a method for producing a full face vehicle wheel and comprises the steps of: (a) providing a rim including an inboard tire bead seat retaining flange, an inboard tire bead seat, a well portion, an outboard tire bead seat, the inboard tire bead seat retaining flange including an outer surface, the inboard tire bead seat including an outer surface, an the outboard tire bead seat including an outer surface; (b) providing a disc including a generally centrally located inner wheel mounting portion and an outer annular portion, the outer annular portion including an inner surface and an outer surface, the inner wheel mounting portion including at least one of a fully formed center pilot hole and a plurality of fully formed lug bolt mounting holes, the center pilot hole defining a pilot hole axis and each of the lug bolt holes defining a lug bolt hole axis; (c) providing a wheel fixture tooling assembly for supporting the rim and the disc relative to one another, the wheel fixture tooling assembly operative to locate the rim on the outer surfaces of the inboard and outboard tire bead seats whereby the inboard and outboard tire bead seats are located relative to the axis of the center pilot hole and the axis of the lug bolt holes; and (d) subsequent to step (c), securing the wheel disc to the wheel rim by a weld.

19 Claims, 9 Drawing Sheets

METHOD AND APPARATUS FOR PRODUCING FULL FACE VEHICLE WHEEL

BACKGROUND OF THE INVENTION

This invention relates in general to vehicle wheels and in particular to an improved full face vehicle wheel and method for producing the same.

A conventional vehicle wheel is typically of a two-piece construction and includes an inner wheel disc and an outer "full" wheel rim. The wheel disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The wheel rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the wheel disc is used. In both types of constructions, the outer annular portion of the wheel disc is secured to the wheel rim by welding.

A full face vehicle wheel is distinguished from other types of vehicle wheels by having a one-piece wheel disc construction. In particular, the full face wheel includes a "full face" wheel disc and a "partial" wheel rim. The full face wheel disc can be cast, forged, or fabricated from steel, aluminum, or other alloys. The full face wheel disc includes an inner annular wheel mounting portion and an outer annular portion which defines at least a portion of an outboard tire bead seat retaining flange of the vehicle wheel. The wheel mounting portion defines an inboard mounting surface and includes a center pilot or hub hole, and a plurality of lug receiving holes formed therethrough for mounting the vehicle wheel to an axle of the vehicle. The partial wheel rim is fabricated from steel, aluminum, or other alloys, and includes an inboard tire bead seat retaining flange, an inboard tire bead seat, an axially extending well, and an outboard tire bead seat. In some instances, the outboard tire bead seat of the wheel rim and the outer annular portion of the wheel disc cooperate to form the outboard tire bead seat retaining flange of the full face vehicle wheel. In both types of constructions, the wheel disc and the wheel rim are supported relative to one another in a predetermined position by clamping and locating off of an inside surface of the well of the wheel rim so that the outboard tire bead seat of the wheel rim is positioned adjacent the outer annular portion of the wheel disc with the inside surface of the well being generally parallel with respect to the center of the hub hole of the wheel disc. While in this position, a weld is applied adjacent the outboard tire bead seat to secure the wheel rim and the wheel disc together.

In the above full face vehicle wheel constructions, after the wheel disc and the wheel rim have been assembled and welded together several finishing operations may be required to produce a wheel having the desired specifications. For example, the location of center pilot hole, the lug receiving holes or both may have to be corrected by an appropriate method so that the associated centerlines thereof are oriented in a predetermined relationship with respect to the bead seats of the vehicle wheel. This is due to the fact that in the welding operation the centerline of the inside surface of the well of the wheel rim may not be concentric to the centerline of the bead seats. Typically the center pilot hole and the lug bolt receiving holes provided in the wheel disc are initially undersized holes. Thus, after the welding process it is usually necessary to size the center pilot hole to a final size by an appropriate process, such as reboring the center pilot hole, so that the axis of the center pilot hole is oriented in a concentric relationship relative to the wheel axis. To accomplish this, the assembled vehicle wheel is clamped or located on the bead seats thereof to ensure that the centerline of the bead seats and the centerline of the final formed center hub hole are located concentric to one another. Also, it is usually necessary to size the lug bolt receiving holes to a final size by an appropriate process, such as repunching the lug bolt receiving holes so that the axes of the lug bolt receiving holes are oriented parallel to the axis of the center hub hole and therefore, the wheel axis.

SUMMARY OF THE INVENTION

This invention relates an apparatus and method for assembling a wheel rim and a wheel disc together to produce a full face vehicle wheel. This invention relates to a method for producing a full face vehicle wheel and comprises the steps of: (a) providing a rim including an inboard tire bead seat retaining flange, an inboard tire bead seat, a well portion, an outboard tire bead seat, the inboard tire bead seat retaining flange including an outer surface, the inboard tire bead seat including an outer surface, and the outboard tire bead seat including an outer surface; (b) providing a disc including a generally centrally located inner wheel mounting portion and an outer annular portion, the outer annular portion including an inner surface and an outer surface, the inner wheel mounting portion including at least one of a fully formed center pilot hole and a plurality of fully formed lug bolt mounting holes, the center pilot hole defining a pilot hole axis and each of the lug bolt holes defining a lug bolt hole axis; (c) providing a wheel fixture tooling assembly for supporting the rim and the disc relative to one another, the wheel fixture tooling assembly operative to locate the rim on the outer surfaces of the inboard and outboard tire bead seats whereby the inboard and outboard tire bead seats are located relative to the axis of the center pilot hole and the axis of the lug bolt holes; and (d) subsequent to step (c), securing the wheel disc to the wheel rim by a weld. Preferably, in step (b) both the center pilot hole and the lug bolt mounting holes are fully formed. Forming the full face vehicle wheel according to the method and using the apparatus of the present invention results in the finished full face vehicle wheel not being subjected to the above described post welding finishing operations.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
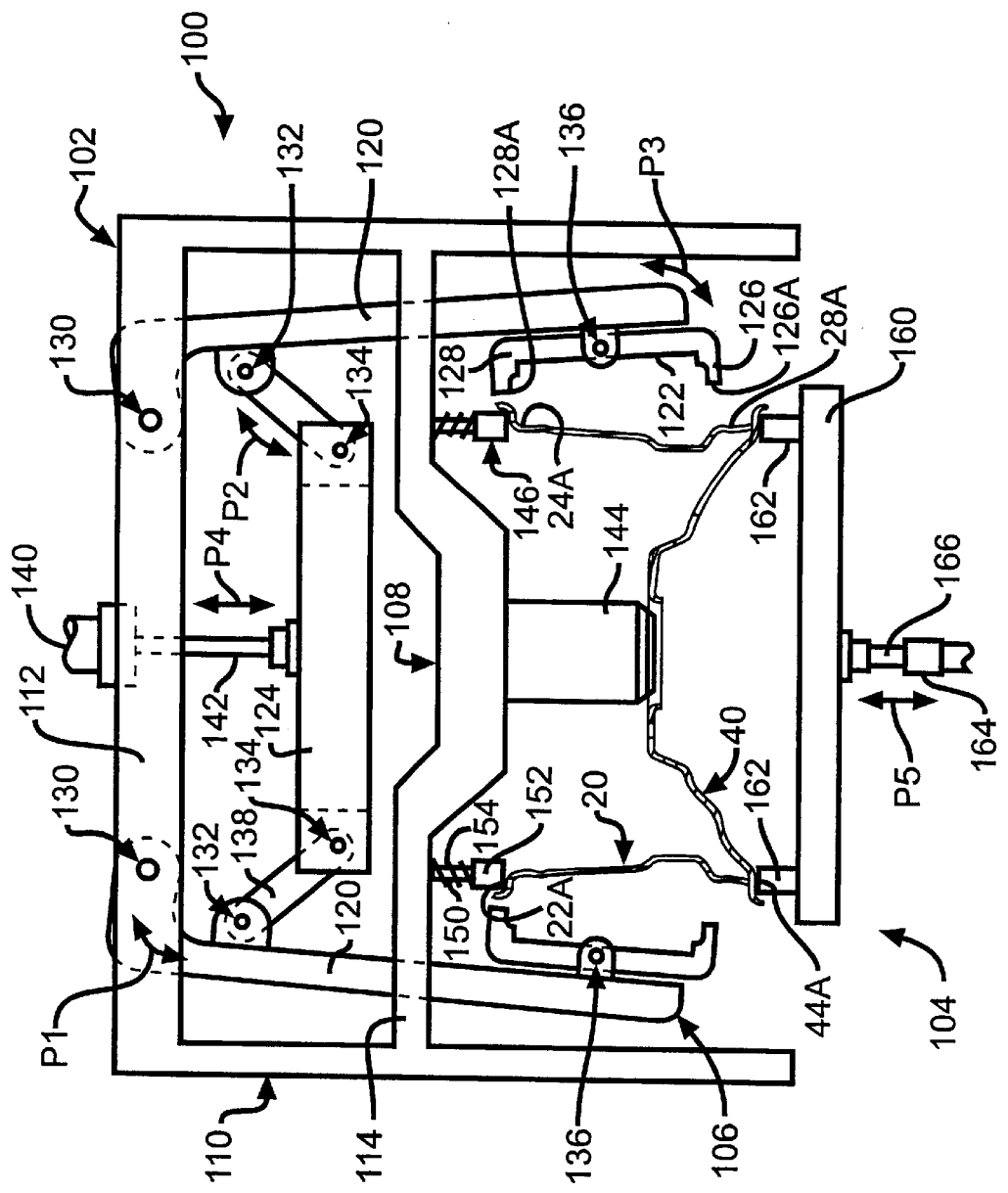
FIG. 1 is an elevational view showing a first embodiment of a wheel fixturing tooling apparatus for use in producing a full face vehicle wheel in accordance with the present invention, the wheel fixturing tooling apparatus being shown in an intermediate partially extended working position.
Figure 2:
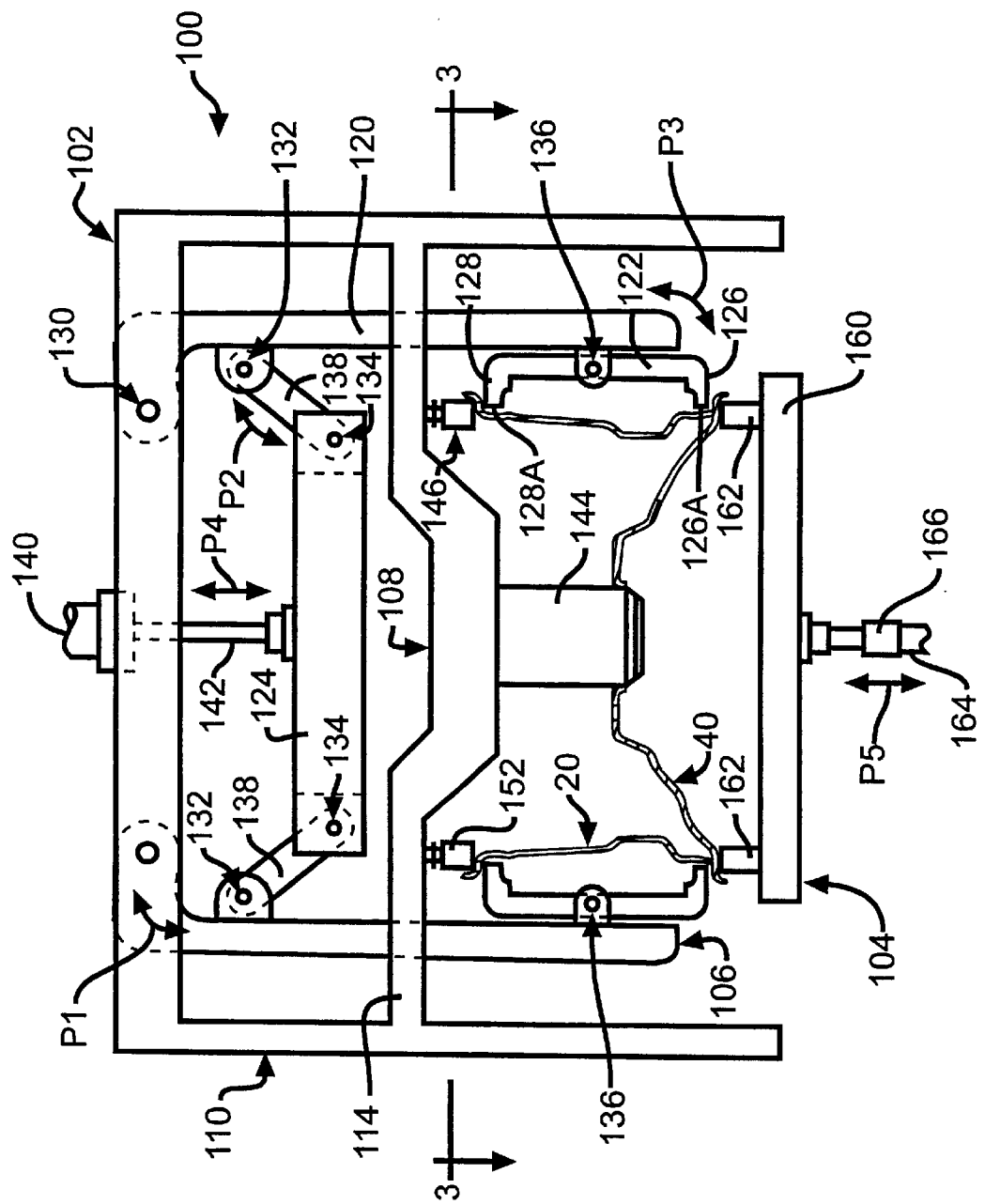
FIG. 2 is an elevational view showing the first embodiment of a wheel fixturing tooling apparatus for use in producing a full face vehicle wheel in accordance with the present invention, the wheel fixturing tooling apparatus being shown in a fully extended working position.
Figure 8:
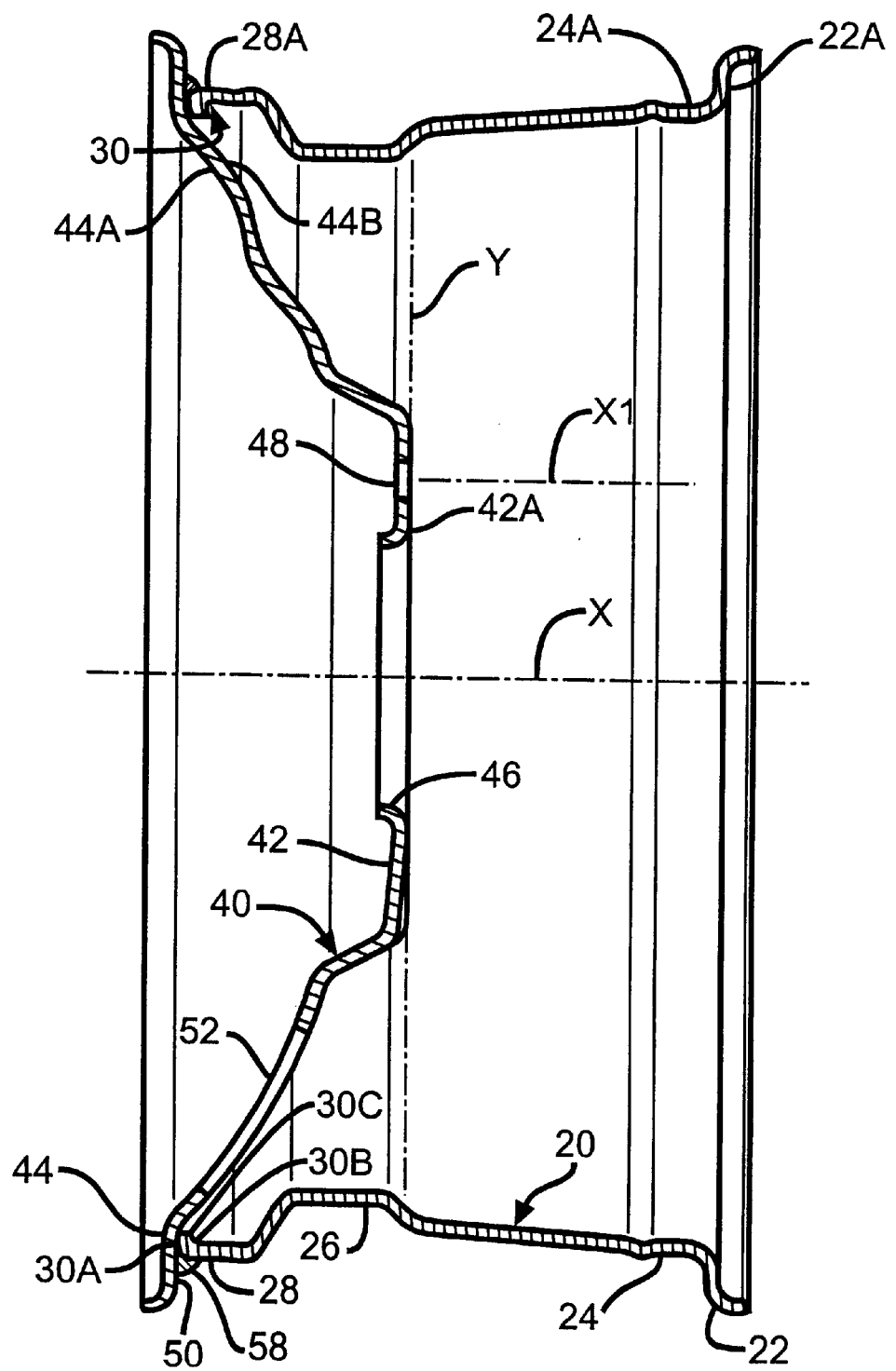
FIG. 8 is a sectional view of a first embodiment of a full face vehicle wheel produced in accordance with the present invention.

Referring now to the drawings, there is illustrated in FIGS. 1 and 2, a wheel fixturing tooling apparatus, indicated generally at 100, for producing a full face vehicle wheel, indicated generally at 10 in FIG. 8, in accordance with the present invention. Although this invention will be described and illustrated in conjunction with the particular vehicle wheels disclosed herein, it will be appreciated that this invention may be used in conjunction with other vehicle wheels.

As shown in FIG. 8, the illustrated full face vehicle wheel 10 includes a wheel rim 20 and a wheel disc 40 which are joined together by a weld 58 during a welding operation. In the illustrated embodiment, the wheel rim 20 is a fabricated wheel rim formed from a suitable material, such as for example, steel, aluminum or alloys thereof, magnesium, or titanium. The wheel rim 20 includes an inboard tire bead seat retaining flange 22, an inboard tire bead seat 24, a generally axially extending well 26, and an outboard tire bead seat 28. The inboard tire bead seat 24 defines an inboard tire bead seat outer surface 24A, the outboard tire bead seat 28 defines an outboard tire bead seat outer surface 28A, and inboard tire bead seat retaining flange defines an outer surface 22A.

In the illustrated embodiment, the outboard tire bead seat 28 of the wheel rim 20 includes a radially inturned flange, indicated generally at 30. The flange 30 includes a generally radially inwardly extending outer surface 30A, a generally radially inwardly extending inner surface 30B, and a generally axially extending endmost surface 30C. Alternatively, the profile of the outermost end of the wheel rim 20 adjacent the outboard tire bead seat 28 can be other than illustrated if desired.

In the illustrated embodiment, the wheel disc 40 is forged, cast, fabricated, or otherwise formed from a suitable material, such as for example, steel, aluminum or alloys thereof, steel, magnesium, or titanium. The wheel disc 40 includes a generally centrally located wheel mounting portion 42 and an outer annular portion 44. The wheel mounting portion 42 is provided with a centrally located pilot aperture 46 and a plurality of lug bolt receiving holes 48 (only one of such lug bolt holes 48 being illustrated in FIG. 8), circumferentially spaced around the pilot aperture 46. The lug bolt receiving holes 48 receive lug bolts (not shown) and nuts (not shown) for securing the vehicle wheel 10 on an axle (not shown) of the vehicle.

The pilot aperture 46 of the wheel disc 40 defines a horizontal or longitudinal axis X, and each of the lug bolt receiving holes 48 define a longitudinal axis X1 which is generally parallel to the pilot aperture axis X. The wheel mounting portion 42 of the wheel disc 40 includes an inboard mounting surface 42A which defines a vertical vehicle wheel axis Y which is generally perpendicular to the pilot aperture axis X and the lug bolt receiving holes axes X1. The pilot aperture axis X also defines a longitudinal axis of the fully assembled vehicle wheel 10.

Figure 9:
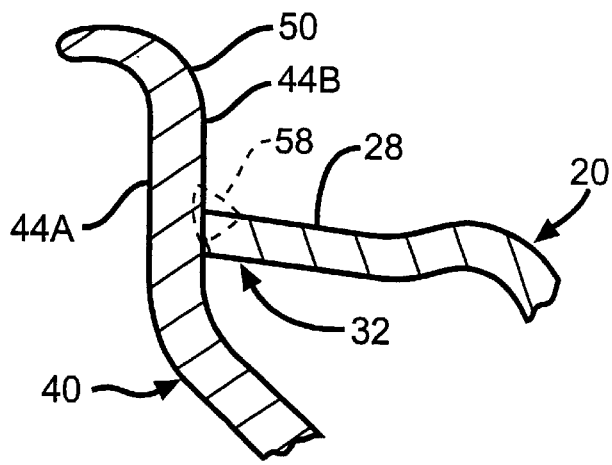
FIG. 9 is a partial sectional view of a second embodiment of a full face vehicle wheel produced in accordance with the present invention.
Figure 10:
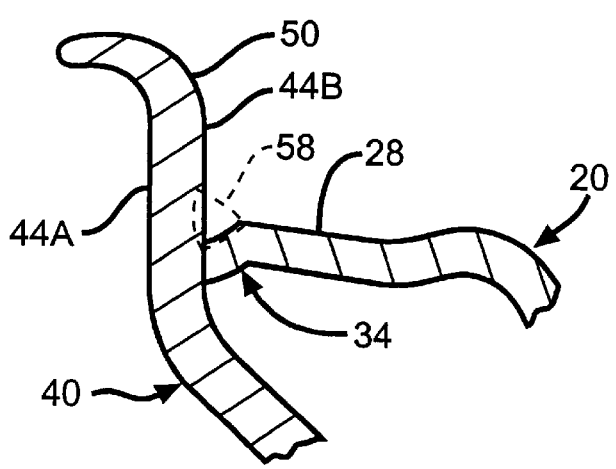
FIG. 10 is a partial sectional view of a third embodiment of a full face vehicle wheel produced in accordance with the present invention.
Figure 11:
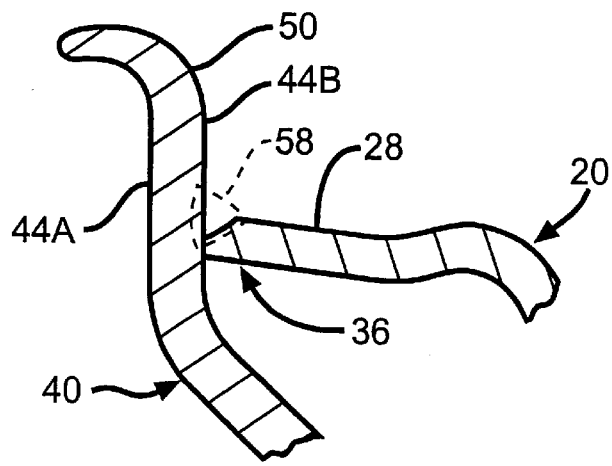
FIG. 11 is a partial sectional view of a fourth embodiment of a full face vehicle wheel produced in accordance with the present invention.

The outer annular portion 44 of the wheel disc 40 includes an outer wheel disc surface 44A and an inner wheel disc surface 44B, and defines an inboard tire bead seat retaining flange 50 of the vehicle wheel 10. The wheel disc 40 may also include a plurality of decorative openings or windows 52 (only one of such decorative openings 52 being illustrated in FIG. 8). Alternatively, the structure of the wheel rim 20 and/or the wheel disc 40 of the full face vehicle wheel 10 can be other than illustrated if desired. For example, the vehicle wheel lo can include a wheel rim 20 having a generally "straight" outboard end, indicated generally at 32 in FIG. 9, an "offset" outboard end, indicated generally at 34 in FIG. 10, or a partly "chamfered" outboard end, indicated generally at 36 in FIG. 11.

Figure 3:
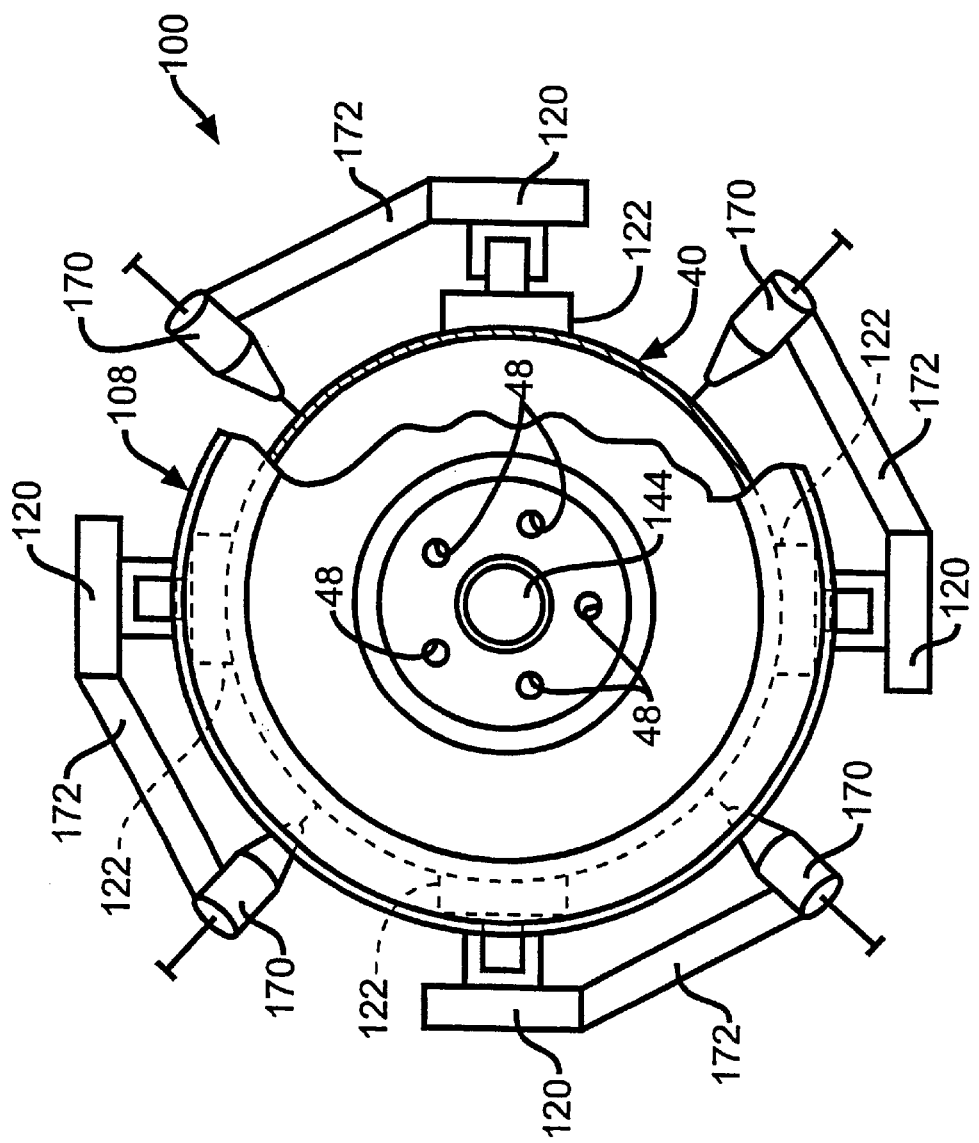
FIG. 3 is a plan view, partially broken away, of the wheel fixturing tooling apparatus illustrated in FIGS. 1 and 2, taken along line 3—3 of FIG. 2.

Turning now to FIGS. 1, 2, 3 and 6, the first embodiment of the vehicle wheel fixturing tooling apparatus 100 and a method for producing the full face vehicle wheel 10 of the present invention will be discussed. To assemble the wheel disc 20 and the wheel rim 40 to produce the vehicle wheel 10 of the present invention, the wheel fixturing tooling apparatus 100 of the present invention is used. As will be discussed below, the illustrated wheel fixturing tooling apparatus 100 of the present invention includes at least two tooling members which are moveable between a retracted or non-working position (not shown), and a fully extended or working position, shown in FIGS. 2 and 3. When the wheel fixturing tooling apparatus 100 is fully extended, the associated tooling members thereof are operative to support the wheel rim 40 at the opposed tire bead seats 24 and 28 thereof so that after the wheel disc 20 and wheel rim 40 are joined together by the weld 58, the preformed pilot aperture 46 and the lug bolt receiving holes 48 are accurately positioned relative to each other and to the tire bead seats 24 and 28 so that no further processing of such aperture 46 and holes 48 is needed. FIG. 3 illustrates the wheel fixturing tooling apparatus 100 in an intermediate or partially extended working position.

Referring now to FIGS. 1, 2 and 3, the wheel fixturing tooling apparatus 100 and method for producing the vehicle wheel 10 in accordance with the present invention will be discussed. As shown in FIGS. 1 and 2, the wheel fixturing tooling apparatus 100 includes an upper or first tooling fixture, indicated generally at 102, and a lower or second tooling fixture, indicated generally at 104. The upper tooling fixture 102 includes a wheel rim support tooling member, indicated generally at 106, and a wheel disc support tooling member, indicated generally at 108.

In the illustrated embodiment, the upper tooling fixture 102 further includes a support frame or structure 110 which has a lower end (not shown) that is fixed to a surface (not shown). The support frame 110 includes an upper or first frame structure 112 and a lower or second frame structure 114. The upper frame structure 112 includes a plurality of spaced apart arm supports 120 (four of such arm supports 120 being shown in FIG. 3), an inner or beadseat clamp arm 122 operatively coupled to a respective one of each of the arms supports 120, and a common center member 124 to which each of the clamp arms 120 is coupled thereto. Alternatively, the structure of one or more of the component parts of the support frame 110 can be other than illustrated if desired.

The arm supports 120 each include a first joint or connection member 130, a second joint or connection 132, a third joint or connection member 134, and a fourth joint or connection 136. The first joint 130 is effective to operatively couple each arm support 120 to the upper frame structure 112 for pivoting movement relative thereto as indicated by arrow P1 during actuation of the center member 124. The second joint 132 and the third joint 134 in combination with a link member 138 is effective to operatively couple center member 124 to the arm support 120 for movement relative thereto as indicated by arrow P2 during actuation of the center member 124. The fourth joint 136 is effective to operatively couple each arm support to an associated inner clamp arm 122 for pivoting movement relative thereto as indicated by arrow P3 during actuation of the center member 124. The center member 124 is operatively connected to a suitable actuating member 140, such as a hydraulic or pneumatic cylinder, by an actuating shaft or piston rod 142 so as to be moveable in a direction as indicated by arrow P4. Alternatively, the structure of the actuating member 140 can be other than illustrated if so desired. For example, other kinds of hydraulic, pneumatic or electric actuating devices, such as ball screws and cylinders, can be used.

Each beadseat clamp arm 122 includes a first end 126 and an opposite second end 128. The first end 126 includes an outer end surface 126A and the second end 128 includes an outer end surface 128A. In the illustrated embodiment, the fourth joint 136 is preferably approximately intermediate the ends 126 and 128 of the beadseat clamp arm 122; however, the fourth joint 136 can be located off center and nearer one of the two ends 126 and 128 of the clamp arm 122 if so desired. As will be discussed below, the outer end surface 126A of the first end 126 of the clamp arm 122 is adapted to engage a portion of the outer surface 24A of the inboard tire bead seat 24 during operation of the wheel fixturing tooling apparatus 10. Similarly, the outer end surface 128A of the second end 128 of the clamp arm 122 is adapted to engage a portion of the outer surface 24A of the inboard tire bead seat 24 during the operation of the wheel fixturing tooling apparatus 10.

The lower frame structure 114 including a center pilot 144 and a plurality of wheel rim support members 146. The center pilot 144 defines an outer diameter slightly greater than the diameter of the pilot aperture 46 of the wheel disc 40. Preferably, as illustrated in this embodiment, the wheel rim support members 146 are spring loaded members and include a shaft 150 secured to the lower frame structure 114, an enlarged head 152, and a spring 154 disposed on the shaft 150 between the head 152 and the frame structure 114. As will be discussed below, the center pilot 144 extends through the pilot aperture 46 of the wheel disc 40 and the support members 146 engage the outer surface 22A of the inboard tire bead seat retaining flange 22 of the wheel rim 20 during the operation of the wheel fixturing tooling apparatus 100. Alternatively, the structure of the wheel disc support members 146 can be other than illustrated if desired. For example, due to the pilot aperture 46 generally not having tight tolerances since it is typically formed by a punch operation, an expanding collet (not shown) may be preferred over the solid center pilot 144.

The lower fixture tooling 104 includes a lift table 160 and a plurality of spaced apart wheel disc support members 162. The lift table 160 is operatively connected to a suitable actuating member 164, such as a hydraulic or pneumatic cylinder, by an actuating shaft or piston rod 166 so as to be moveable in a direction as indicated by arrow P5. As will be discussed below, the wheel disc support members 162 engage a portion of the outer surface 44A of the wheel disc 40 during the operation of the wheel fixturing tooling apparatus 10.

The wheel fixturing tooling apparatus 10 further includes a plurality of welding torches 170 (four of such welding torches 170 being partially illustrated in FIG. 3). As shown therein, the torches 170 are operatively connected to the arm supports 120 for movement therewith. To accomplish this, a bracket or support member 172 is provided to connect the torch 170 to the arm support 120. Alternatively, the number, the structure, and/or the support of the welding torches 170 can be other than illustrated if desired. For example, one or more of the welding torches 170 can be supported independent from the wheel fixture tooling apparatus 100.

Figure 7:
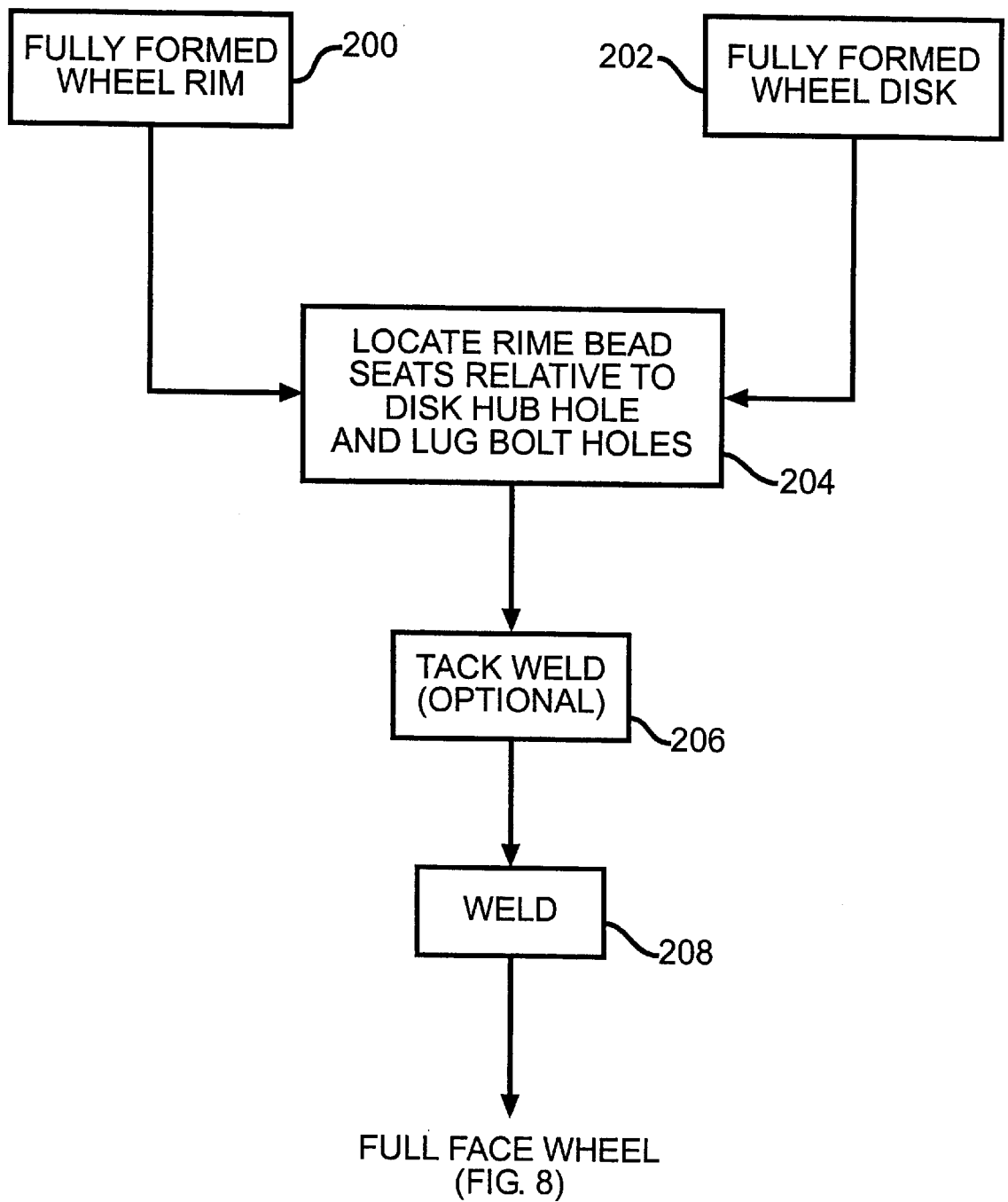
FIG. 7 is a block diagram showing a sequence of steps for producing the full face vehicle wheel in accordance with the present invention.

Turning now to FIGS. 1, 2, and 7, the method for producing the full face fabricated vehicle wheel 10 of the present invention will be discussed. Initially in step 200, a fully formed full face wheel rim 20 is provided. As discussed above, the wheel rim 20 includes the inboard tire bead seat outer surface 24A, the outboard tire bead seat outer surface 28A, and the inboard tire bead seat retaining flange outer surface 22A. In step 202, a fully formed wheel disc 40 is provided. As discussed above, the wheel disc 40 includes the centrally located pilot aperture 46, the lug bolt receiving holes 48, and the outer wheel disc surface 44A. Preferably, both the pilot aperture 46 and the lug bolt receiving holes 48 are fully formed; however only one of the pilot aperture or the lug bolt receiving holes 48 can be fully formed.

Next, in step 204, the wheel rim 20 and the wheel disc 40 are supported by and positioned on the wheel fixturing apparatus 10 of the present invention so as to locate the wheel rim tire bead seat outer surfaces 24A and 28A in a predetermined position relative to the axis X of the pilot aperture and the axis X1 of the lug bolt receiving holes 48. To accomplish this, the wheel disc 40 is supported on the lower fixture tooling 104 by the wheel disc support member 162 contacting a portion of the outer surface 44A of the wheel disc 40. In order to do this, the lower fixture tooling 104 is in a fully retracted position (not shown). Next, the wheel rim 20 is supported on the wheel disc 40. In particular, the wheel rim 20 is supported on the wheel disc 40 by positioning the inturned flange 30 of the wheel rim 20 on the inner surface 44B of the wheel disc 40.

Following this, the actuating member 164 is actuated so as to move or raise the lift table 160, and therefore the unwelded wheel assembly, in the direction of the arrow P5. In order to do this, the arm supports 120 are in their retracted positions, as shown in FIG. 1. The lift table 160 continues to be raised whereby the outer surface 22A of the inboard tire bead seat retaining flange 22 of the wheel rim 20 wheel disc 40 initially engage and compress the wheel rim support members 146, as shown in FIG. 1. At about the same time, the pilot aperture 46 of the wheel disc 40 initially begins to pass over the center pilot 144 of the wheel disc support 108, as shown in FIG. 1.

The lift table 160 continues to be raised until the unwelded wheel assembly reaches a predetermined position, as shown in FIG. 2. As shown therein, this causes the outer surface 22A of the inboard tire bead seat retaining flange 22 of the wheel rim 20 wheel disc 40 to further engage and compress the wheel rim support members 146, and the pilot aperture 46 of the wheel disc 40 to be further pass over the center pilot 144 of the wheel disc support 108. Such a movement of the lift table 160 can be selectively controlled by any suitable means. For example, the location of the top of the lift table 160 relative to a fixed reference surface, such as the floor. Also, movement of the lift table 160 is preferably automatically controlled by suitable means. For example, a sensor (not shown) can be provided to sense the position of the lift table 160 relative to the floor and can send a signal to a controller (not shown) which is operatively connected to actuate and move the lift table 160. Alternatively, other automatic and/or manual systems can be used to selectively control the movement of the lift table 160, and therefore, the unwelded wheel assembly.

With the lift table 160 in its desired raised position, the hydraulic cylinder 140 is selectively actuated by suitable means thereby moving the arm supports 120 inwardly toward the wheel assembly. In particular, the beadseat clamp arms 122 are moved inwardly toward the wheel assembly until the end surfaces 126A and 128A of the respective arms 126 and 128 thereof engage the bead seat surfaces 28A and 24A, respectively. Such movement of the arm supports 120 can be selectively controlled by any suitable means. For example, one or more sensors (not shown) can be provided to sense when the beadseat clamp arms 122 have engaged the bead seat surfaces 28A and 24A of the wheel rim 20 and have positioned such surfaces in a predetermined position relative to the axis X and X1 of the center pilot 46 and the lug bolt holes 48, respectively. Also, movement of the arms supports 120 is preferably automatically controlled. Alternatively, other automatic and/or manual systems can be used to selectively control the movement of the arm supports 120, and therefore, the beadseat clamp arms 122.

Following this, in optional step 206, the welding torches 170 are actuated to provide a tack weld (not shown) to secure the wheel rim 20 and the wheel disc 40 together. The reason for the tack weld is because the welding torches 170 cannot produce a 360 degree continuous weld due to the arm supports 120 being in the weld path.

Next, in step 208, the tack welded wheel assembly is subjected to a final weld process. To accomplish this, the following processes can be used. One process that can be used involves removing the tack welded wheel assembly from the wheel fixturing tooling apparatus 10 of the present invention and processing it on a separate welding station to produce the weld 58. Another process involves moving the arm supports 120 to their retracted positions, moving the lift table 160 to its lowered position, and using a separately controlled welding station to produce the weld 58. Still another process involves moving the arm supports 120 to their retracted positions, and provide separate adjustment for the welding torches 170 to enable them to produce the weld with the lift table 160 in either the raised position (FIG. 2) or the lowered position. Also, depending upon the particular wheel construction and the type of weld needed to join together the wheel rim 20 and the wheel disc 40, the tack weld step 206 can be eliminated and the weld of step 208 can be made with the wheel fixturing tooling assembly 10 in the position shown in FIG. 2 using the welding torches 170. For example, if a 360 degree continuous weld is not required, step 206 could be eliminated and step 208 can be used with the wheel fixturing tooling assembly 10 in the position shown in FIG. 2 and using the welding torches 170 to join together the wheel rim 20 and the wheel disc 40 with a non-continuous weld 58. This can be the case if a tube tire is used, if a solid tire is used, or if a glue, adhesive, or other suitable material is disposed in the non-welded sections for use with any type of tire. In addition, the tack weld step could be eliminated if the welding torches 170 are initially actuated and begin to produce the weld and when a sufficient weld to prevent relative movement of the wheel disc 40 to the wheel rim 20 has occurred, the support arms 120 are retracted and welding torches 170 continue welding to produce a continuous at least 360 degree weld. Such a process would require the welding torches to be adjustable relative to the support arms 120 to enable the torches 170 to weld independent of the position of the support arms 120.

Figure 4:
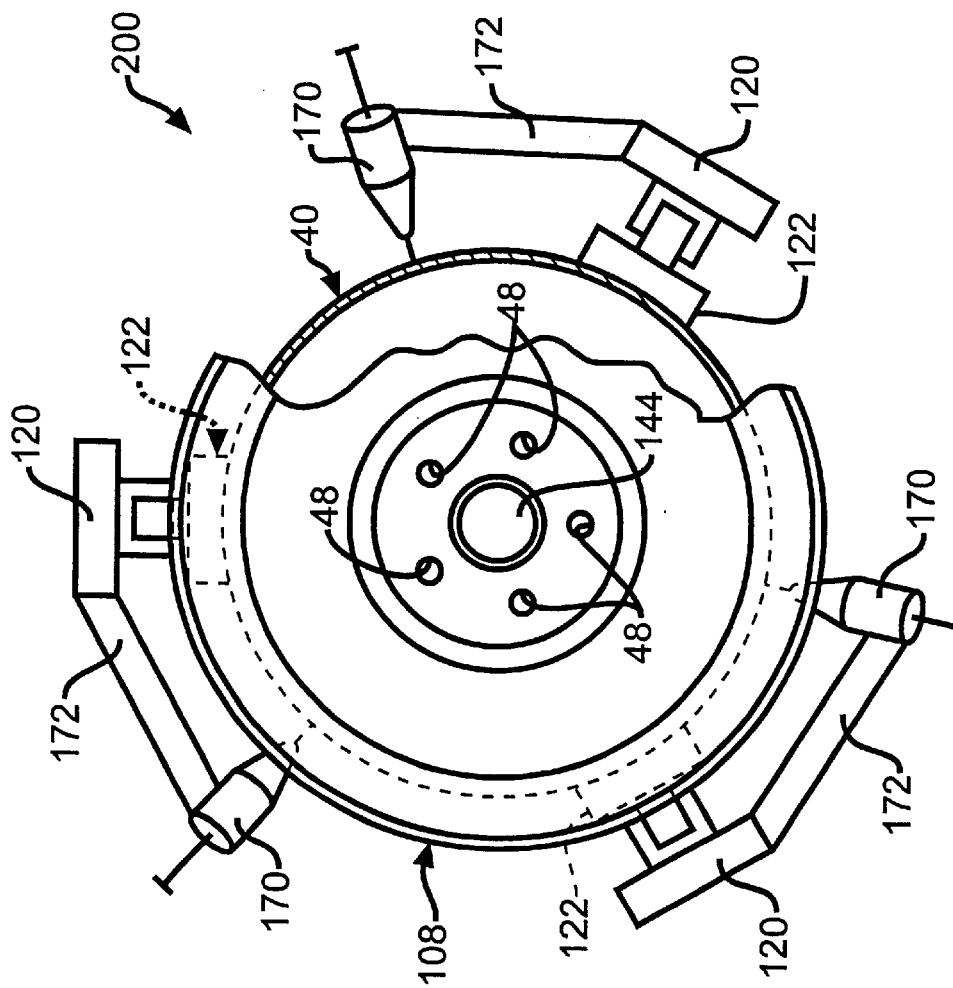
FIG. 4 is a plan view, partially broken away, of a second embodiment of a wheel fixturing tooling apparatus for use in producing a full face vehicle wheel in accordance with the present invention.

Turning now to FIG. 4 and using like reference numbers to indicated corresponding components, there is illustrated a portion of a second embodiment of a wheel fixturing tooling assembly, indicated generally at 200, which can be used to produce a vehicle wheel in accordance with the present invention. The wheel fixturing tooling assembly 200 is similar to the wheel fixturing tooling assembly 100 illustrated in FIGS. 1–3 except that it includes only three spaced apart arm supports 120 and three welding torches 170. Preferably, at least three arms supports 120 are provided and more preferably four arm supports 120 as illustrated in FIGS. 1–3 are provided. But, depending upon the particular wheel structure the number of arms supports 120 and/or welding torches 170 can be other than illustrated if so desired. For example, less than two arm supports 120 and welding torches 170 can be provided and more than four arm supports 120 and welding torches 170 can be provided. Also, the number of the arm supports 120 and the welding torches 170 do not have to be the same but can be different from each other.

Figure 5:
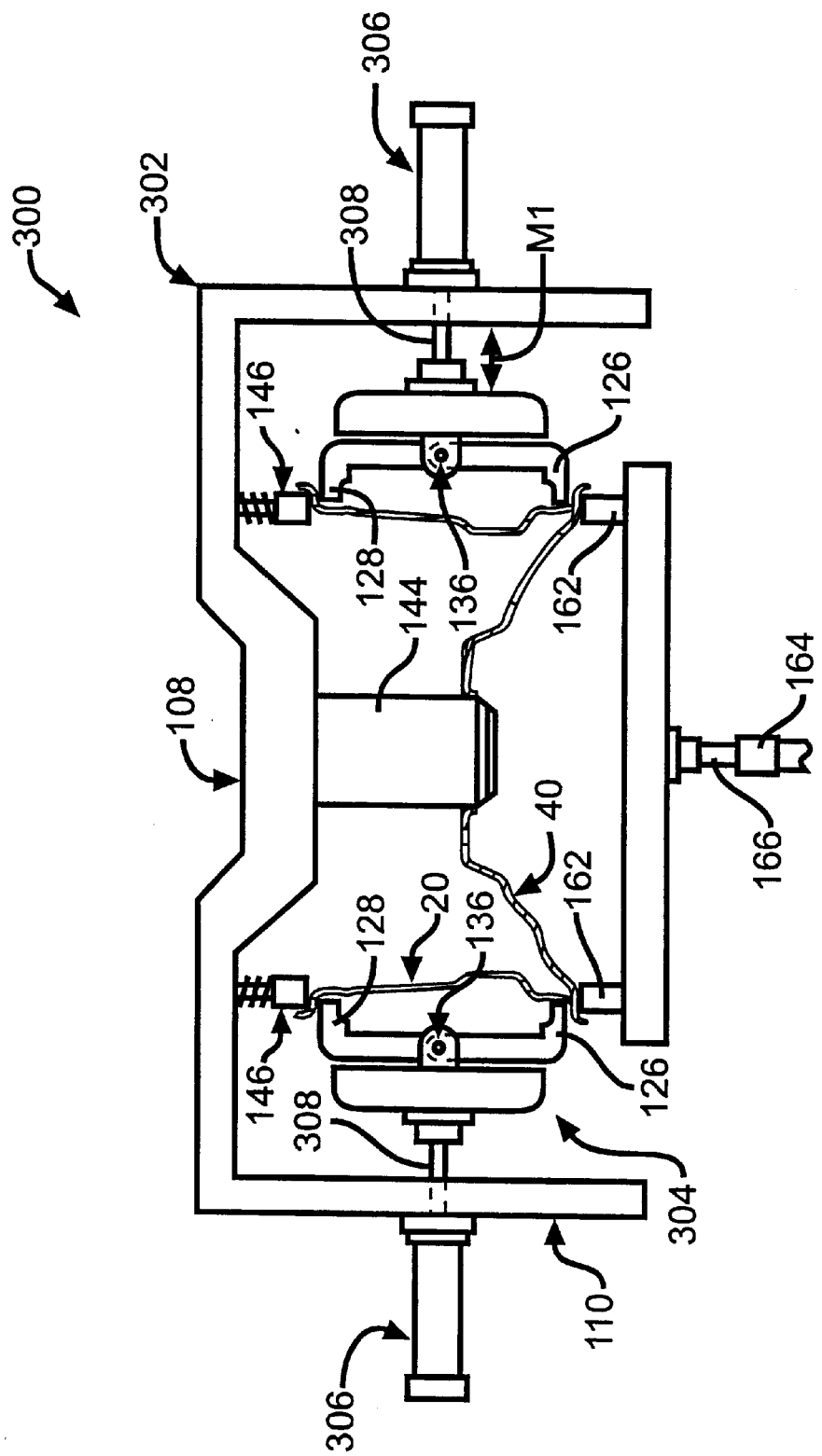
FIG. 5 is an elevational view showing a third embodiment of a wheel fixturing tooling apparatus for use in producing a full face vehicle wheel in accordance with the present invention, the wheel fixturing tooling apparatus being shown in a fully extended working position.

Turning now to FIG. 5 and using like reference numbers to indicated corresponding components, there is illustrated a portion of a third embodiment of a wheel fixturing tooling assembly, indicated generally at 300, which can be used to produce a vehicle wheel in accordance with the present invention. The wheel fixturing tooling assembly 300 is similar to the wheel fixturing tooling assembly 100 illustrated in FIGS. 1–3 except for the structure of an upper tooling fixture 302 thereof. In this embodiment, the upper tooling fixture 302 includes a plurality of beadseat clamp arm assemblies, indicated generally at 304, which are supported on the fixture for selective movement in a generally horizontal direction, as indicated by the arrow M1, between a retracted non-working position (not shown) and an extended working position. To accomplish this in the illustrated embodiment, the clamp arm assemblies 304 are operatively connected to a suitable actuating member, indicated generally at 306, by an actuating shaft or piston rod 308 so as to be moveable in the direction of the arrow M1. The welding torches (not shown) for use with the wheel fixturing tooling apparatus 300 can be carried by the fixture 302 by any suitable means or can be separate from the fixture 302. Preferably, the wheel fixture tooling assembly 300 includes at least three clamp arm assemblies 304. But, depending upon the particular wheel structure, the number of clamp arm assemblies 304 can be other than illustrated if so desired.

Figure 6:
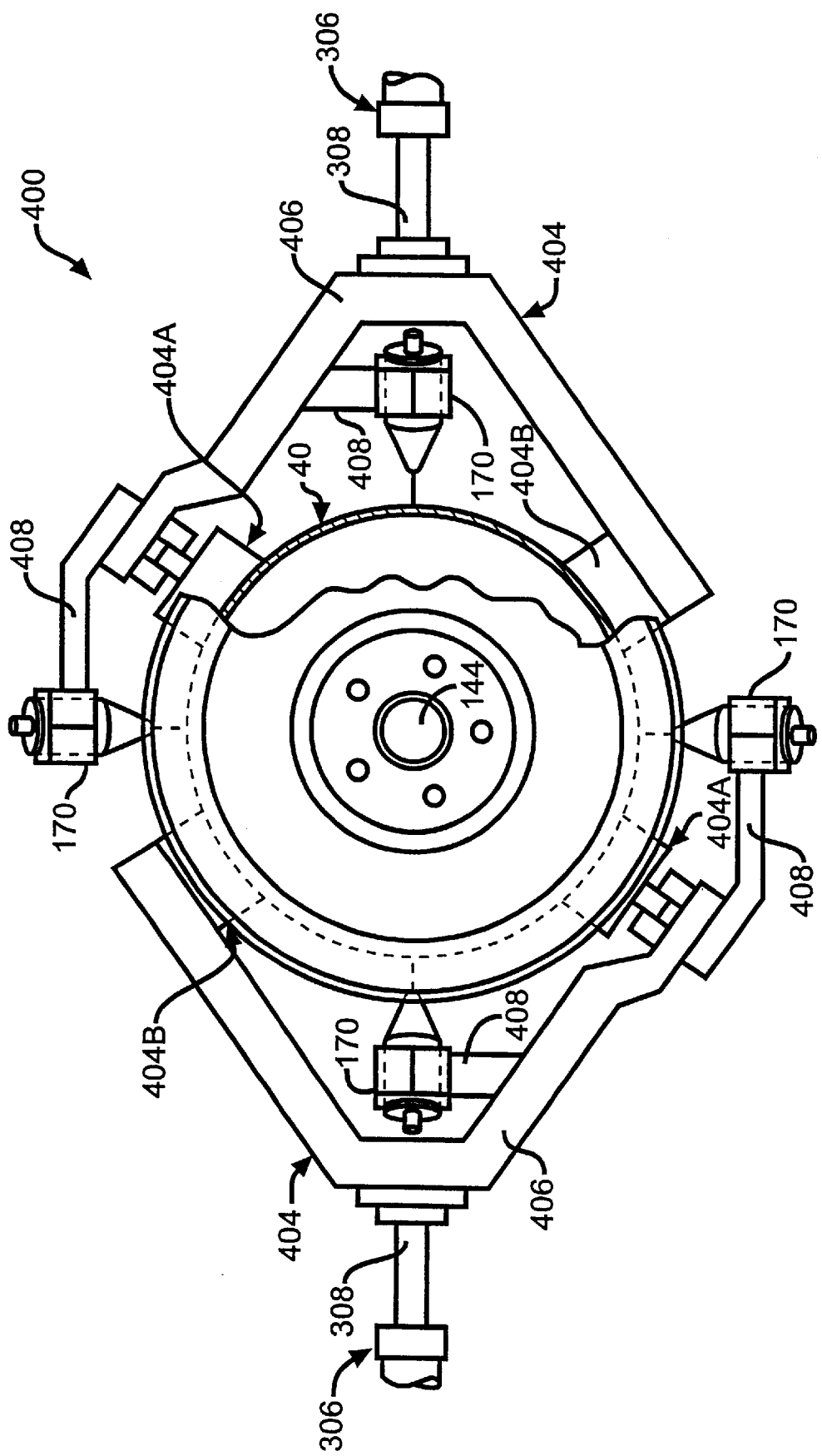
FIG. 6 is a plan view, partially broken away, of a fourth embodiment of a wheel fixturing tooling apparatus for use in producing a full face vehicle wheel in accordance with the present invention, the wheel fixturing tooling apparatus being shown in a fully extended working position.

Turning now to FIG. 6 and using like reference numbers to indicated corresponding components, there is illustrated a portion of a third embodiment of a wheel fixturing tooling assembly, indicated generally at 400, which can be used to produce a vehicle wheel in accordance with the present invention. The wheel fixturing tooling assembly 400 is similar to the wheel fixturing tooling assembly 300 illustrated in FIG. 5 except for the structure of the beadseat clamp assemblies. In this embodiment, two double beadseat clamp arm assemblies, indicated generally at 404, are provided. Each beadseat clamp arm assembly 404 includes a pair of beadseat clamp arm assemblies 404A and 404B which are supported on the fixture for selective movement in a generally horizontal direction between a retracted non-working position (not shown) and an extended working position. To accomplish this in the illustrated embodiment, the clamp arm assemblies 404 are operatively connected to the actuating member 306 by a support member 406. Also, a pair of welding torches 170 are operatively coupled to the support member 406 by a respective torch support member 408. Alternatively, the welding torches 170 can be separate from the fixture 400. In addition, the beadseat clamp arm assemblies 404B can be pivotally supported relative to the support members 406 or the support members 406 can be pivotally supported relative to the actuating member 306 or the piston rod 308

In accordance with the provisions of the patent statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for assembling a wheel rim and a wheel disc together to produce a full face vehicle wheel comprising the steps of:
    (a) providing a wheel rim including an inboard tire bead seat retaining flange, an inboard tire bead seat, a well portion, an outboard tire bead seat, the inboard tire bead seat retaining flange including an outer surface, the inboard tire bead seat including an outer surface, and the outboard tire bead seat including an outer surface;
    (b) providing a wheel disc including a generally centrally located inner wheel mounting portion and an outer annular portion, the outer annular portion including an inner surface and an outer surface, the inner wheel mounting portion including at least one of a fully formed center pilot hole and a plurality of fully formed lug bolt mounting holes spaced circumferentially around the center pilot hole, the center pilot hole defining a pilot hole axis and each of the lug bolt holes defining a lug bolt hole axis;
    (c) providing a wheel fixture tooling assembly for supporting the wheel rim and the wheel disc relative to one another, the wheel fixture tooling assembly including a pair of beadseat clamp arms pivotally movable between a first non-working position, wherein the clamp arms do not engage the inboard and outboard tire bead seats of the wheel rim, and a second working position, wherein the clamp arms engage only the inboard and outboard tire bead seats of the wheel rim;
    (d) operating the wheel fixture tooling assembly whereby the beadseat clamp arms are pivotally moved to the second working position to engage only the outer surfaces of the inboard and outboard tire bead seats of the wheel rim so as to locate the inboard and outboard tire bead seats of the wheel rim in a predetermined position relative to the axis of the at least one of the fully formed center pilot hole and the fully formed lug bolt holes of the wheel disc; and
    (e) subsequent to step (d), securing the wheel disc to the wheel rim by a weld to produce the full face vehicle wheel.

2. The method defined in claim 1 wherein in the step (b) both the center pilot hole and the plurality of lug bolt mounting holes are fully formed.

3. The method according to claim 1 wherein in the step (a) the outboard tire bead seat of the wheel rim terminates at a radially inturned flange.

4. The method according to claim 1 wherein in the step (a) the outboard tire bead seat of the wheel rim terminates at a generally straight outboard end.

5. The method according to claim 1 wherein in the step (a) the outboard tire bead seat of the wheel rim terminates at a generally partly chamfered outboard end.

6. The method according to claim 1 wherein in the step (a) the outboard tire bead seat of the wheel rim terminates at an offset outboard end.

7. The method according to claim 1 wherein the step (e) includes providing an initial tack weld followed by providing a final weld.

8. The method according to claim 7 wherein the final weld is a 360 degree continuous weld.

9. The method according to claim 1 wherein the step (e) includes providing a non-continuous weld for securing the wheel disc to the wheel rim.

10. The method according to claim 1 wherein the step (e) includes providing a 360 degree continuous weld for securing the wheel disc to the wheel rim.

11. A method for assembling a wheel rim and a wheel disc together to produce a full face vehicle wheel comprising the steps of:
    (a) providing a fully formed wheel rim including an inboard tire bead seat retaining flange, an inboard tire bead seat, a well portion, an outboard tire bead seat, the inboard tire bead seat retaining flange including an outer surface, the inboard tire bead seat including an outer surface, and the outboard tire bead seat including an outer surface;
    (b) providing a fully formed wheel disc including a generally centrally located inner wheel mounting portion and an outer annular portion, the outer annular portion including an inner surface and an outer surface, the inner wheel mounting portion including a fully formed center pilot hole and a plurality of fully formed lug bolt mounting holes spaced circumferentially around the center pilot hole, the center pilot hole defining a pilot hole axis and each of the lug bolt holes defining a lug bolt hole axis;
    (c) providing a wheel fixture tooling assembly for supporting the fully formed wheel rim and the fully formed wheel disc relative to one another, the wheel fixture tooling assembly including a pair of beadseat clamp arms pivotally movable between a first non-working position, wherein the clamp arms do not engage the inboard and outboard tire bead seats of the fully formed wheel rim, and a second working position, wherein the clamp arms engage only the inboard and outboard tire bead seats of the fully formed wheel rim;

(d) operating the wheel fixture tooling assembly whereby the beadseat clamp arms are pivotally moved to the second working position to engage only the outer surfaces of the inboard and outboard tire bead seats of the fully formed wheel rim so as to locate the inboard and outboard tire bead seats of the fully formed wheel rim in a predetermined position relative to the axis of the fully formed center pilot hole and the fully formed lug bolt holes of the wheel disc; and (e) subsequent to step (d), securing the fully formed wheel disc to the fully formed wheel rim by a weld to produce the full face vehicle wheel.

12. The method according to claim 11 wherein in the step (a) the outboard tire bead seat of the fully formed wheel rim terminates at a radially inturned flange.

13. The method according to claim 11 wherein in the step (a) the outboard tire bead seat of the fully formed wheel rim terminates at a generally straight outboard end.

14. The method according to claim 11 wherein in the step (a) the outboard tire bead seat of the fully formed wheel rim terminates at a generally partly chamfered outboard end.

15. The method according to claim 11 wherein in the step (a) the outboard tire bead seat of the fully formed wheel rim terminates at an offset outboard end.

16. The method according to claim 11 wherein the step (e) includes providing an initial tack weld followed by providing a final weld.

17. The method according to claim 16 wherein the final weld is a 360 degree continuous weld.

18. The method according to claim 11 wherein the step (e) includes providing a non-continuous weld for securing the wheel disc to the wheel rim.

19. The method according to claim 11 wherein the step (e) includes providing a 360 degree continuous weld for securing the wheel disc to the wheel rim.

* * * * *